(12) United States Patent
Wang

(10) Patent No.: US 7,656,683 B2
(45) Date of Patent: Feb. 2, 2010

(54) ELECTRICAL CONVERSION DEVICE, CONVERTER AND UNINTERRUPTIBLE ELECTRIC POWER SUPPLY COMPRISING ONE SUCH DEVICE

(75) Inventor: Miao-xin Wang, Montbonnot Saint Martin (FR)

(73) Assignee: Eaton Power Quality SAS, Montbonnot-St-Martin (FR)

( * ) Notice: Subject to any disclaimer, the term of this patent is extended or adjusted under 35 U.S.C. 154(b) by 281 days.

(21) Appl. No.: 11/808,187

(22) Filed: Jun. 7, 2007

(65) Prior Publication Data

US 2008/0002438 A1    Jan. 3, 2008

(30) Foreign Application Priority Data

Jun. 29, 2006    (FR)    ................................. 06 05888

(51) Int. Cl.
*H02M 3/335* (2006.01)
(52) U.S. Cl. .......................................... 363/16; 363/80
(58) Field of Classification Search ............. 363/16–20, 363/21.07, 21.12, 97, 95, 131, 64; 315/219, 315/176; 323/282–288
See application file for complete search history.

(56) References Cited

U.S. PATENT DOCUMENTS 4,767,978 A    8/1988    Reid ........................... 323/282
5,610,804 A *  3/1997    Shimizu ................... 363/21.16

FOREIGN PATENT DOCUMENTS

EP    0 690 553    1/1996

OTHER PUBLICATIONS

Ayyanar, R. et al, "An Improved Full-ZVS-Range Hybrid DC-DC Converter with Low Filter Requirement Capable of Adding and Subtracting the Controlled and Uncontrolled Sections," IEEE, vol. 1, Jun. 18, 2000, pp. 179-184.

* cited by examiner

*Primary Examiner*—Rajnikant B Patel
(74) *Attorney, Agent, or Firm*—Kirk D. Houser, Esq.; Eckert Seamans Cherin & Mellot, LLC

(57) ABSTRACT

A DC voltage conversion device comprising:
first conversion means,
transformation means connected to the first conversion means, and
superposition and rectifying means connected to the first conversion means and to the transformation means, and supplying an output voltage comprising pulses having equal amplitudes to the sum of the amplitudes of the pulses of the primary and the secondary pulsed voltage.

A converter for converting a DC voltage into AC voltage comprising the DC voltage conversion device, filtering means being connected on output of the superposition and rectifying means of said conversion device.

An uninterruptible electric power supply comprising a converter for converting a DC voltage into AC voltage connected to storing means, said converter comprising the DC voltage conversion device to convert the DC voltage of said storing means.

9 Claims, 6 Drawing Sheets

US 7,656,683 B2

ELECTRICAL CONVERSION DEVICE, CONVERTER AND UNINTERRUPTIBLE ELECTRIC POWER SUPPLY COMPRISING ONE SUCH DEVICE

BACKGROUND OF THE INVENTION

The invention relates to a DC voltage conversion device comprising:
first conversion means to receive the DC voltage and to supply a primary pulsed voltage, and
transformation means connected to the first means to supply a secondary pulsed voltage.

The invention also relates to a converter for converting a DC voltage into AC voltage comprising:
the previously described DC voltage conversion device,
filtering means connected to said conversion device, and
second conversion means connected to the filtering means.

The invention further relates to an uninterruptible electric power supply comprising:
storing means for storing electric power, and
a converter for converting a DC voltage into AC voltage connected to the storing means, said converter comprising the previously described DC voltage conversion device.

STATE OF THE ART

The transformation means of prior art conversion devices generally enable an electric power to be transferred between the input and output of said devices, and the amplitude of the pulses of a primary pulsed voltage supplied by the first conversion means to be stepped-up or stepped-down, step-up being performed according to a transformation ratio of said transformation means.

Such conversion devices are often used in converters for converting DC voltage into AC voltage such as those implemented in an uninterruptible electric power supply or an inverter.

An example of a DC voltage conversion device according to the prior art is represented in FIG. 1. The conversion device represented can also be qualified as a conversion device of the "direct current-direct current" type, abbreviated to "DC-DC". More specifically, the DC voltage conversion device represented enables a DC voltage Vin to be converted into a pulsed and rectified output voltage Vout1.

The conversion device 1 comprises first conversion means 2, rectifying means 3, and transformation means 4. The transformation means 4 for their part comprise a transformer comprising at least one primary winding 5 connected to the first conversion means and at least one secondary winding 6 connected to the rectifying means.

The first conversion means 2 comprise two transistor branches 11 and 12, i.e. a transistor bridge, to convert the DC voltage Vin into a primary pulsed voltage V1 on the primary winding of the transformer. Each transistor branch comprises at least two transistors connected in series. In the case represented in FIG. 1, the branch 11 comprises two transistors T1 and T3, and the branch 12 comprises two transistors T2 and T4. The mid-points 13 and 14, respectively of the branches 11 and 12, are connected to the ends of the primary winding 5 of the transformer 4. The first conversion means 2 also comprise rectifying means formed by diodes d1, d2, d3 and d4 reverse-connected in parallel respectively on the transistors T1, T2, T3 and T4. The diodes d1 to d4 protect the transistors and make the first conversion means reversible, i.e. in another reversible mode, they enable a pulsed voltage to be rectified.

The rectifying means 3 comprise four diodes D1, D2, D3 and D4 to convert a secondary pulsed voltage V2 on the secondary winding 6 of the transformer 4 into pulsed and rectified output voltage Vout1. The diodes are arranged on two branches 21 and 22, each of the branches 21 and 22 comprising at least two diodes connected in series and in the same direction. In the case represented in FIG. 1, the branch 21 comprises two diodes D1 and D3, and the branch 22 comprises two diodes D2 and D4. The mid-points 23 and 24, respectively of the branches 21 and 22, are connected to the ends of the secondary winding 6 of the transformer 4.

In such a DC voltage conversion device according to the prior art, the transformer 4 transfers the whole of the power between the first conversion means 2 and the rectifying means 3. In such a conversion device, the electronic components of the first conversion means and of the rectifying means have to withstand all of the transferred power. This can result in significant heat losses and can require implementation of bulky thermal dissipation means.

SUMMARY OF THE INVENTION

The object of the invention is to remedy the shortcomings of conversion devices of the prior art.

The invention relates to a DC voltage conversion device comprising:
First conversion means to receive the DC voltage and to supply a primary pulsed voltage, and
transformation means connected to the first conversion means to supply a secondary pulsed voltage.

The device according to the invention comprises primary and secondary voltage superposition and rectifying means to supply a pulsed and rectified output voltage, said superposition and rectifying means being connected to the first conversion means and to the output of the transformation means.

Preferably, the superposition and rectifying means are adapted so as to supply a pulsed and rectified output voltage comprising pulses having amplitudes substantially equal to the sum of the amplitudes of the pulses of the primary pulsed voltage and of the secondary pulsed voltage.

According to one embodiment, at least one conductor on output from the first conversion means is connected to the superposition and rectifying means.

In general, the first conversion means are low-frequency or high-frequency conversion means.

Preferably, the transformation means comprise at least one primary winding connected to the output of the first conversion means and at least one secondary winding connected to the input of the superposition and rectifying means, the coiling direction of the primary winding of the transformer being the same as that of the secondary winding.

Preferably, the first conversion means comprise two transistor branches on which at least two transistors are connected in series, the mid-point of each branch being connected to the input of the transformation means and to first inputs of the superposition and rectifying means.

Preferably, the superposition and rectifying means comprise two diode branches, each branch comprising at least two diodes connected in series in the same direction, the mid-point of each branch being connected to the output of the transformation means. Advantageously, the incoming ends of each branch are connected to the output of the first conversion means.

The invention also relates to a converter for converting a DC voltage into AC voltage comprising:
a DC voltage conversion device,
filtering means connected to said conversion device, and second conversion means connected to the filtering means.

In the converter according to the invention, the conversion device is a device as described above, supplying a pulsed voltage of higher amplitude than the DC voltage, the filtering means of the converter being connected on output of the superposition and rectifying means of said conversion device.

The invention also relates to an uninterruptible electric power supply comprising:
- storing means for storing electric power, and
- a converter for converting a DC voltage into AC voltage connected to the storing means, said converter comprising a DC voltage conversion device.

In the uninterruptible electric power supply according to the invention, the DC voltage conversion device is a device as described above, said device being used to convert the DC voltage supplied by said storing means into pulsed voltage of higher amplitude than the DC voltage.

BRIEF DESCRIPTION OF THE DRAWINGS

Other advantages and features will become more clearly apparent from the following description of particular embodiments of the invention, given as non-restrictive examples only and represented in the accompanying drawings.

FIG. 4 shows the elements of the conversion device through which a current flows when the transistors T1 and T4 of the first conversion means are on.

FIG. 5 shows the elements of the conversion device through which a current flows when the transistors T2 and T3 of the first conversion means are on.

DETAILED DESCRIPTION OF PREFERRED EMBODIMENTS

Figure 2:
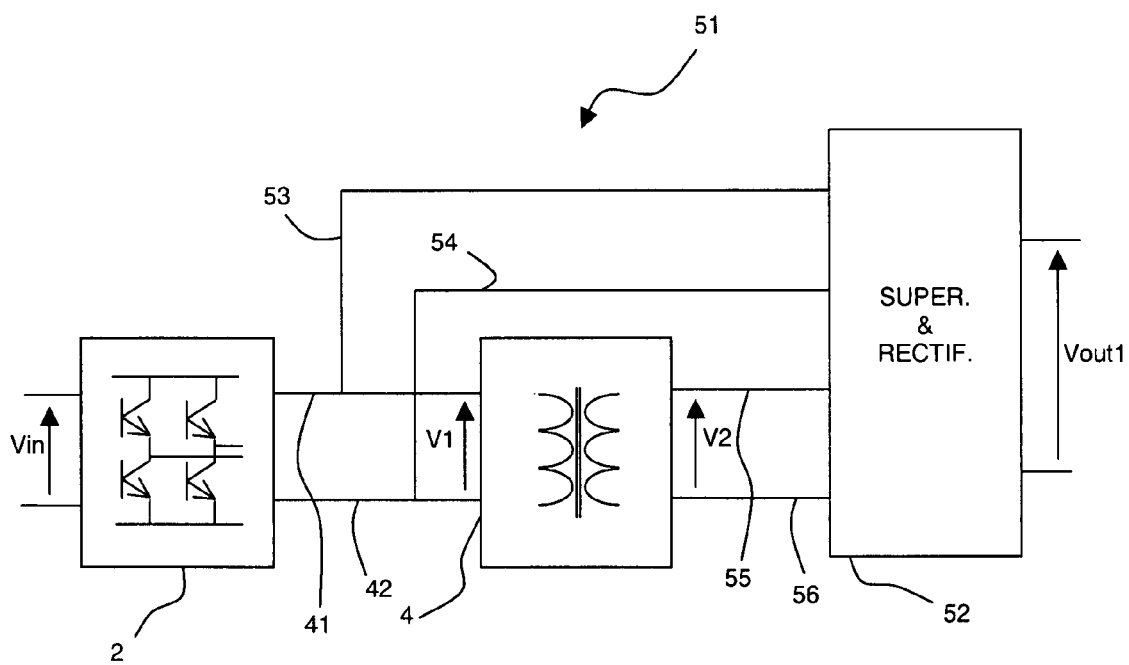
FIG. 2 represents an embodiment of the DC voltage conversion device according to the invention.

The conversion device 51 represented in FIG. 2 comprises first conversion means 2 to supply a primary pulsed voltage V1 from the DC voltage Vin. What is meant by pulsed voltage is a voltage comprising pulses of any width. In the case of the primary pulsed voltage V1, the sign of the pulses changes alternately. The conversion device 51 also comprises transformation means 4 to supply a secondary pulsed voltage V2 from the primary pulsed voltage V1. The transformation means are connected to the first conversion means by means of the conductors 41 and 42.

According to one of the features of the invention, the conversion device 51 comprises superposition and rectifying means 52 to supply a pulsed and rectified output voltage Vout1 from the secondary pulsed voltage V2 and the primary pulsed voltage V1. For this purpose, the superposition and rectifying means 52 are connected to the first conversion means 2 by means of the conductors 53 and 54, and to the transformation means by means of the conductors 55 and 56.

Figure 3:
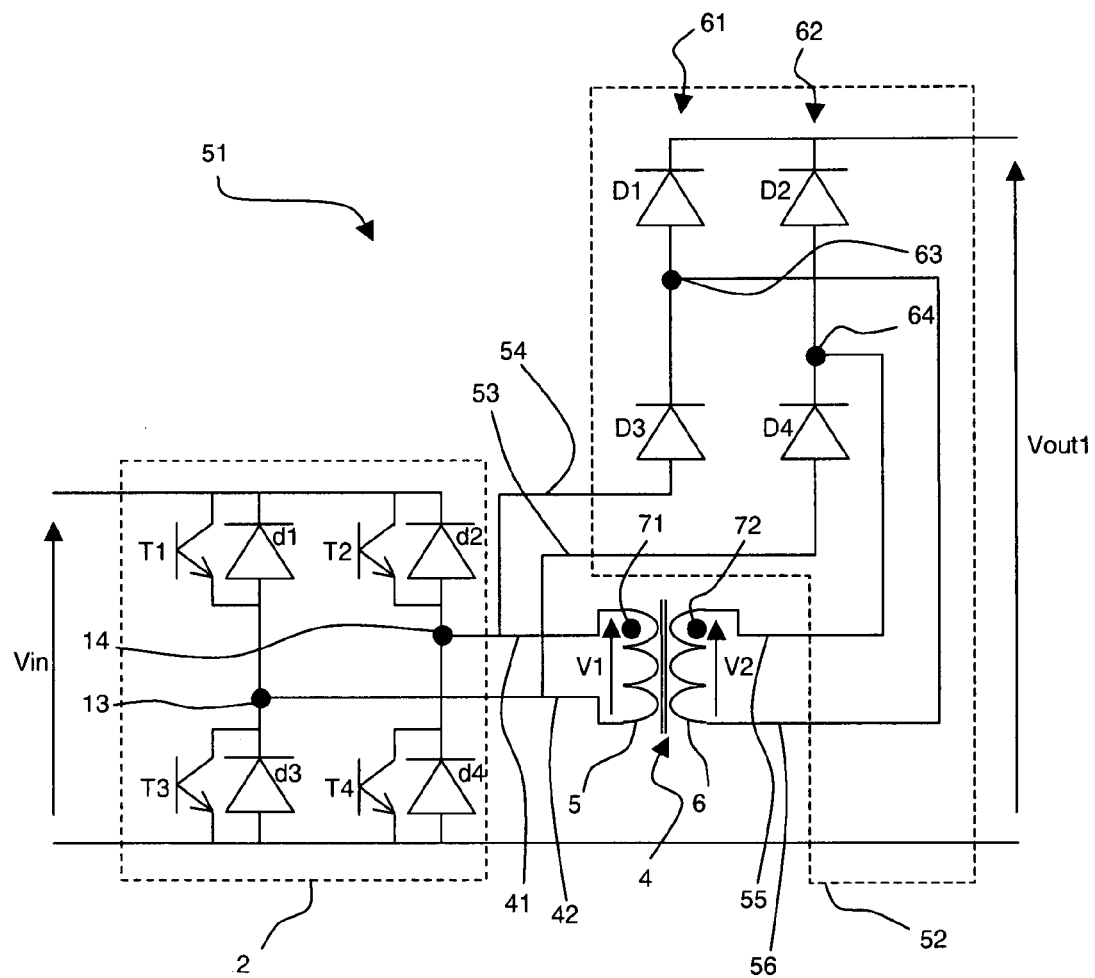
FIG. 3 represents a DC voltage conversion device according to the invention in more detailed manner.

The conversion device 51 for converting a DC voltage Vin, represented in FIG. 3, comprises elements already represented in FIG. 2, i.e. the first conversion means 2, transformation means 4 connected to the first conversion means by the conductors 41 and 42, superposition and rectifying means 52 connected to the transformation means by the conductors 55 and 56 and connected to the first conversion means by the conductors 53 and 54.

The transformation means 4 comprise a transformer comprising a primary winding 5 connected to the first conversion means by the conductors 41 and 42, and a secondary winding 6 connected to the superposition and rectifying means by the conductors 55 and 56.

Figure 1:
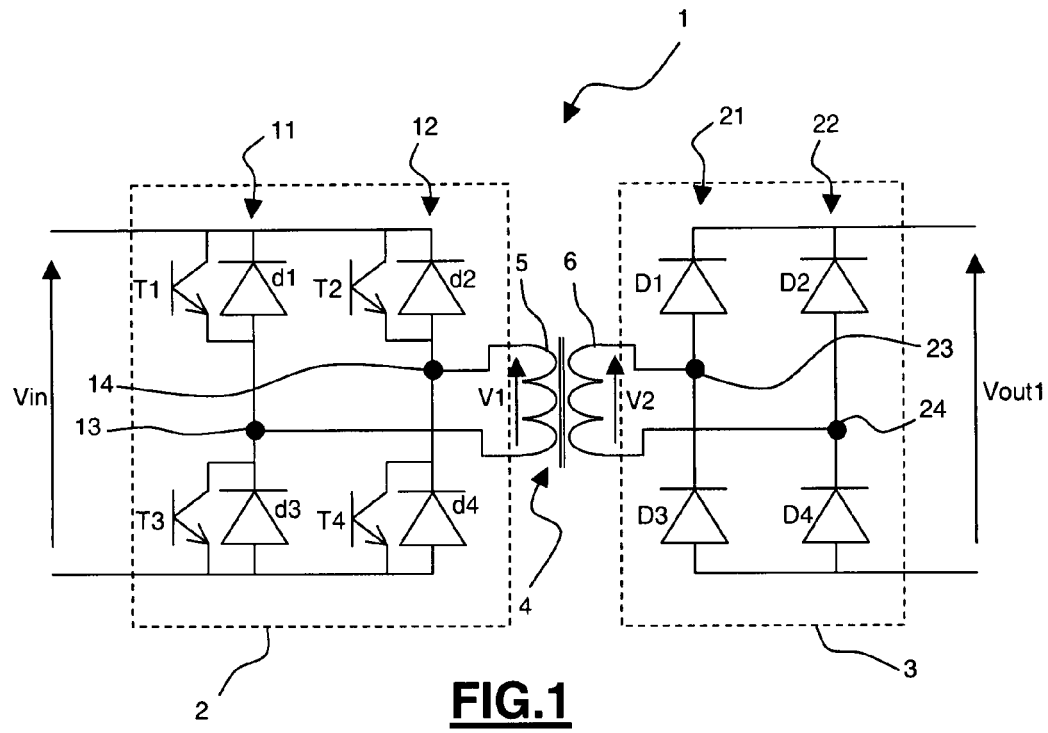
FIG. 1 represents a DC voltage conversion device according to the prior art.

As in the case represented in FIG. 1, the first conversion means 2 comprise two transistor branches T1, T2, T3 and T4. The transistors can for example be of bipolar type, of MOS type, of field effect type, or of IGBT type. The mid-points 13 and 14 are connected to each of the ends of the primary winding 5 of the transformer 4 by means of the conductors 41 and 42. The mid-points 13 and 14 are also connected to first inputs of the superposition and rectifying means via the conductors 53 and 54. The voltage V1 on the primary winding 5 is a pulsed voltage converted from the DC voltage Vin. The first conversion means 2, as they are represented in FIG. 3, also comprise rectifying means, in this case diodes d1, d2, d3 and d4 reverse-connected in parallel respectively on the transistors T1, T2, T3 and T4. The diodes d1 to d4 protect the transistors and make the first conversion means reversible. The diodes thus enable a pulsed voltage presenting opposite sign alternations to be rectified.

The superposition and rectifying means 52 comprise two branches 61 and 62 of diodes D1, D2, D3 and D4. The branch 61 comprises two diodes D1 and D3 connected in series and in the same direction. In the same way, the branch 62 comprises two diodes D2 and D4 connected in series and in the same direction. The mid-points 63 and 64, respectively of the branches 61 and 62, constitute second inputs of the superposition and rectifying means and are connected to the ends of the secondary winding 6. The output voltage Vout1 of the superposition and rectifying means 52 is a rectified pulsed voltage. What is meant by rectified pulsed voltage is a voltage comprising positive pulses of any width.

In the conversion device 51 represented in FIG. 3, the ends of the primary winding 5 of the transformer 4 are connected to the first inputs of the superposition and rectifying means 52 by means of the conductors 53 and 54. More precisely, the end of the primary winding, connected to the mid-point 13, is also connected to one of the first inputs which constitutes the incoming end of the branch 62, by means of the conductor 53. In the same way, the end of the primary winding connected to the mid-point 14 of the transistor bridge is also connected to one of the first inputs which constitutes the incoming end of the branch 61 by means of a conductor 54. The superposition and rectifying means 52 are thereby supplied on the one hand by the secondary pulsed voltage V2 on the secondary winding 6 and on the other hand by the primary pulsed voltage V1 on the primary winding 5.

Moreover, in the conversion device 51 represented in FIG. 3, the coiling direction of the primary winding 5, symbolized by the point 71, is the same as the coiling direction of the secondary winding 6 symbolized by the point 72. The fact that the coiling direction of the primary and secondary windings are identical is represented by the presence of the points 71 and 72 on the same end of the magnetic core of the transformer.

In the conversion device 51 represented in FIG. 3, the electric power transmitted between the first conversion means 2 and the superposition and rectifying means 52 is transmitted by the transformation means 4 and by the conductors 53 and 54. The part of the power transmitted by the transformation means is therefore reduced in comparison with the conversion device of the prior art represented in FIG. 1. It is therefore not necessary to choose electronic components and transformation means dimensioned to withstand the whole of the power transmitted between the input and the output, as was the case with the conversion device according to the prior art. The size of the components, i.e. of the transistors and diodes, and of transformation means, is therefore reduced.

This advantage of the conversion device of the invention can be assessed by comparing the power level withstood by each electronic component of the conversion device 51 according to the invention as compared with the power level withstood by this same component in the equivalent conversion device according to the prior art. To do this, it is possible to determine, for each component, what is the maximum voltage Vmax and the maximum current Imax to which said component is subjected. Generally, the maximum voltage Vmax corresponds to the voltage when said current is not flowing in the component. A power stress can be determined from the maximum voltage Vmax and the maximum current Imax. This stress can be defined as being the ratio of the product of the maximum voltage Vmax by the maximum current Imax over the maximum power transmitted Pmax.

In the same way, it is possible to compare the power level withstood by the transformation means by determining the maximum voltage Vmax and the maximum current Imax on the secondary winding of the transformer. In the same way as for the electronic components, a power stress can be determined from the maximum voltage and the maximum current. In the same way, the power stress of the transformer can be defined as being the ratio of the product of the maximum voltage Vmax by the maximum current Imax over the maximum power transmitted Pmax.

The power stress can therefore be determined for each component and for the transformer, in the case of the prior art device represented in FIG. 1 and in the case of the equivalent device according to the invention represented in FIG. 3.

The maximum voltages and currents, and the power stress, can be expressed as a function:

of the input DC voltage Vin of the conversion device,
of the intensity of the output current Iout of this same device, and
of the transformation ratio of the transformer.

In the following, it has been set down that the transformation ratio of the transformation means 4, i.e. the ratio between the number of turns of the secondary winding over the number of turns of the primary winding, is equal to R1, for the device of FIG. 1, and is equal to R2 for the device of FIG. 3.

Power Stresses of the Components and Transformer of the Device of FIG. 1:

The power transmitted by the conversion device represented in FIG. 1, according to the prior art, is substantially equal to the product of the input DC voltage Vin by the input current, i.e. substantially equal to the product of the input DC voltage Vin by the output current Iout and by the transformation ratio R1.

The maximum voltage Vmax on each of the transistors T1, T2, T3 and T4 of the first conversion means 2 is substantially equal to the DC voltage Vin. Indeed, when one of the transistors, on each of the transistor branches 11 and 12, is on, the other transistor is off and is therefore subjected to the DC voltage Vin at the input of the conversion device.

The maximum current Imax in each of the transistors T1, T2, T3 and T4 of the first conversion means is for its part substantially equal to the product of the transformation ratio R1 by the output current Iout of the conversion device. Indeed, when one of the transistors is on, the current in said transistor is equal to the current in the primary winding 5. This current is moreover equal to the product of the transformation ratio R1 by the current in the secondary winding 6, the latter being equal to the output current Iout of the conversion device.

The maximum voltage Vmax on each of the diodes D1, D2, D3 and D4 of the rectifying means 3 is substantially equal to the product of the input DC voltage Vin by the transformation ratio R1. The maximum current Imax in each of the diodes D1, D2, D3 and D4 of the rectifying means 3 is for its part substantially equal to the output current Iout.

The maximum voltage Vmax on the secondary winding of the transformer is substantially equal to the product of the transformation ratio R1 by the input DC voltage Vin. The maximum current Imax of the transformer is for its part substantially equal to the output current Iout.

From the maximum voltage Vmax and the maximum current Imax determined above, the power stress can be determined for each of the components and for the transformer. In the case of the conversion device of FIG. 1, according to the prior art, the power stresses of each component and of the transformer are substantially equal to unity.

The maximum voltages and currents and the power stresses of the components and transformer of the conversion device of FIG. 1, according to the prior art, are presented in the first column of table 1 below.

Power Stresses of the Components and Transformer of the Device of FIG. 3:

The power transmitted by the conversion device represented in FIG. 3, according to the invention, is substantially equal to the product of the input DC voltage Vin by the sum of the currents in the primary and secondary, windings i.e. substantially equal to the product of the input DC voltage Vin by the output current Iout and by the sum of the transformation ratio R2 and unity.

Figure 4:
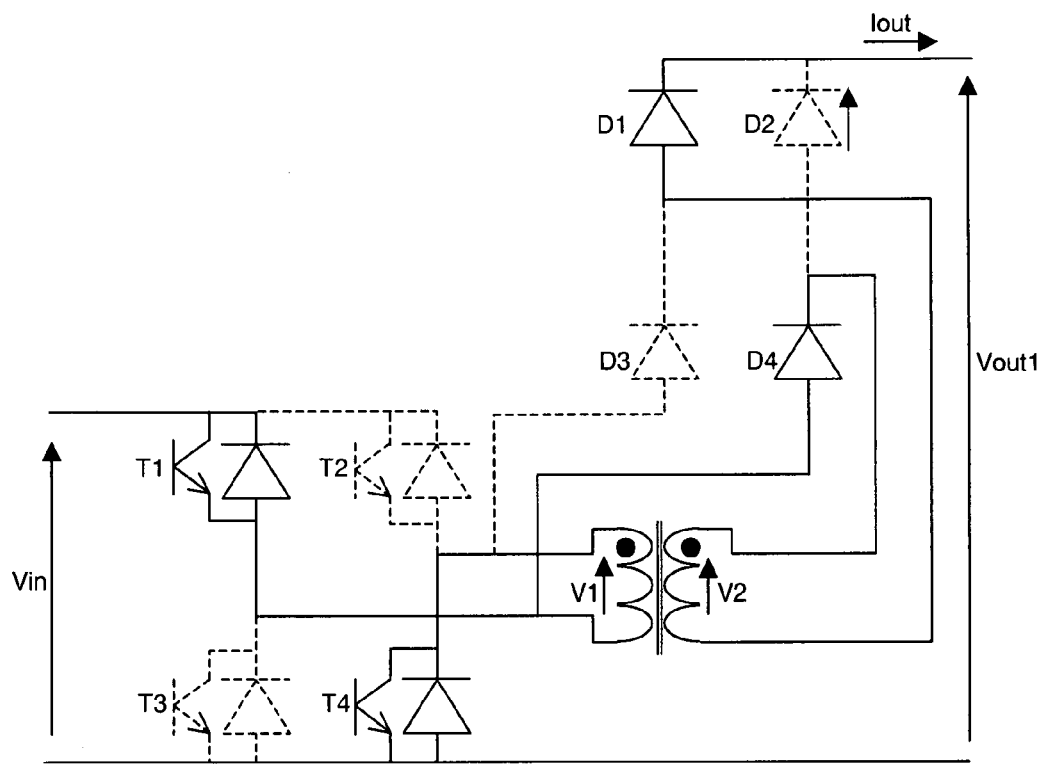

When the transistors T1 and T4 of the first conversion means 2 are on, the conversion device 51 can be represented by the circuit of FIG. 4, in which the elements which are not conducting are represented in broken lines. In this particular case, the diodes D2 and D3 are not conducting.

Referring to FIG. 4, in the case where the transistors T1 and T4 are on, the maximum current Imax in the transistor T1 is substantially equal to the sum of the currents in the primary winding and in the secondary winding, i.e. substantially equal to the product of the sum of the transformation ratio and unity (1+R2) by the output current Iout. The maximum current Imax in the transistor T4 is for its part substantially equal to the current in the primary winding, i.e. substantially equal to the product of the transformation ratio R2 by the output current Iout. The maximum currents Imax in the diodes D1 and D4, and the maximum current Imax in the secondary winding of the transformer, are substantially equal to the output current Iout.

Referring to FIG. 4, in the case where the transistors T1 and T4 are on, the maximum voltages Vmax on the transistors T2 and T3 are substantially equal to the input DC voltage Vin. The maximum voltages Vmax on the diodes D2 and D3, and the maximum voltage Vmax on the secondary winding of the transformer, are substantially equal to the voltage on the secondary winding V2, i.e. to the product of the transformation ratio R2 by the input DC voltage Vin.

Figure 5:
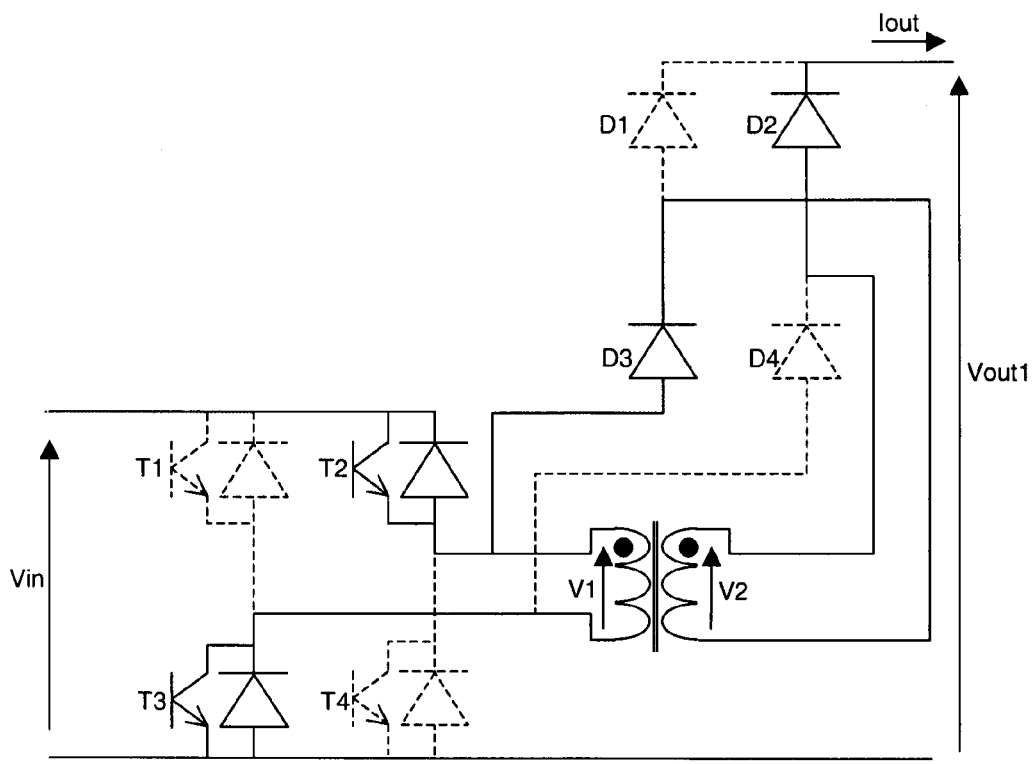

When the transistors T2 and T3 of the first conversion means 2 are on, the conversion device 51 can be represented by the circuit of FIG. 5, in which the elements which are not conducting are represented in broken lines. In this particular case, the diodes D1 and D4 are not conducting.

Referring to FIG. 5, in the case where the transistors T2 and T3 are on, the maximum current Imax in the transistor T2 is substantially equal to the sum of the currents in the primary winding and in the secondary winding, i.e. substantially equal to the product of the sum of the transformation ratio and unity (1+R2) by the output current Iout. The maximum current Imax in the transistor T3 is for its part substantially equal to the current in the primary winding, i.e. substantially equal to the product of the transformation ratio R2 by the output current Iout. The maximum currents Imax of the diodes D2 and D3 are substantially equal to the output current Iout.

Referring to FIG. 5, in the case where the transistors T2 and T3 are on, the maximum voltages Vmax on the transistors T1 and T4 are substantially equal to the input DC voltage Vin. The maximum voltages Vmax on the diodes D1 and D4 are substantially equal to the voltage on the secondary winding V2, i.e. to the product of the transformation ratio R2 by the input DC voltage Vin.

From the maximum voltage Vmax and the maximum current Imax determined above, the power stress can be determined for each of the components and for the transformer. In the case of the conversion device of FIG. 3, according to the invention, the power stresses of most of the components and of the transformer are substantially equal to the ratio between the transformation ratio R2 and the sum of the transformation ratio R2 and unity, except for the transistors T1 and T2.

The maximum voltages and currents and the power stresses of the components and of the transformer of the conversion device of FIG. 3, according to the invention, are presented in the second column of table 1 below.

TABLE 1

|  | Topology according to the prior art (FIG. 1) | Topology according to the invention (FIG. 3) |
|---|---|---|
| Input voltage | Vin | Vin |
| Output current | Iout | Iout |
| Transformation ratio | R1 | R2 |
| Power transmitted (Pmax) | R1 * Vin * Iout | (1 + R2) * Vin * Iout |
| Stresses on transistors T1 and T2 | | |
| Vmax | Vin | Vin |
| Imax | R1 * Iout | (1 + R2) * Iout |
| Vmax * Imax/Pmax | 1 | 1 |
| Stresses on transistors T3 and T4 | | |
| Vmax | Vin | Vin |
| Imax | R1 * Iout | R2 * Iout |
| Vmax * Imax/Pmax | 1 | R2/(1 + R2) |
| Stresses on transformer | | |
| Vmax | R1 * Vin | R2 * Vin |
| Imax | Iout | Iout |
| Vmax * Imax/Pmax | 1 | R2/(1 + R2) |
| Stresses on diodes D1, D2, D3 and D4 | | |
| Vmax | R1 * Vin | R2 * Vin |
| Imax | Iout | Iout |
| Vmax * Imax/Pmax | 1 | R2/(1 + R2) |

The power stresses of the transformer and of most of the components of the conversion device of FIG. 3, according to the invention, are less than 1. The power level withstood by most of the components and by the transformer of the device according to the invention is therefore generally reduced in comparison with the device according to the prior art.

The DC voltage conversion device according to the invention can be integrated in a converter for converting DC voltage into AC voltage. The DC voltage conversion device according to the invention can also be integrated in an uninterruptible power supply or in the DC-to-AC voltage converter of such an uninterruptible power supply.

Figure 6:
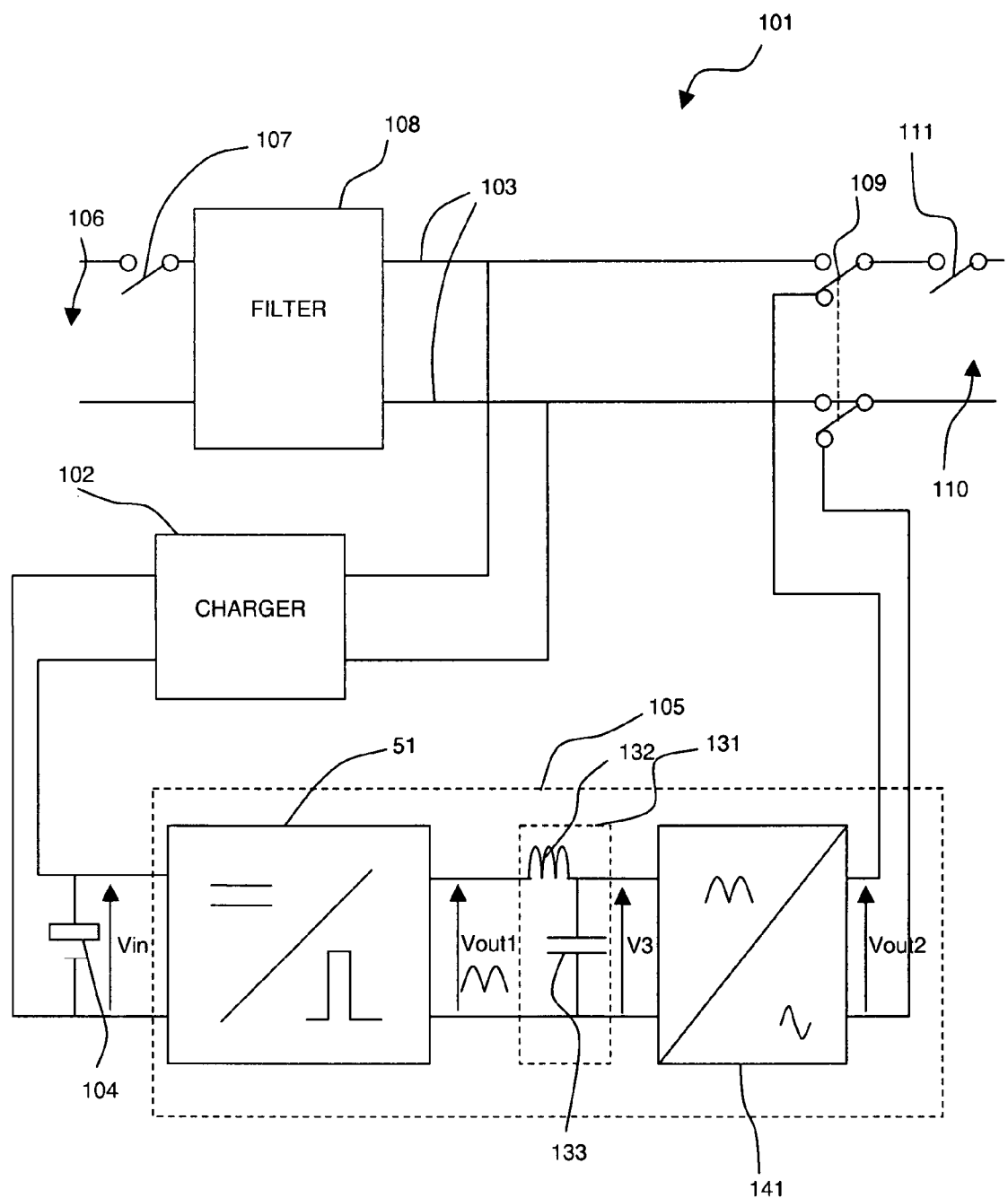
FIG. 6 schematically represents an interruptible power supply comprising a converter for converting a DC voltage into AC voltage equipped with a conversion device.
Figure 7A:
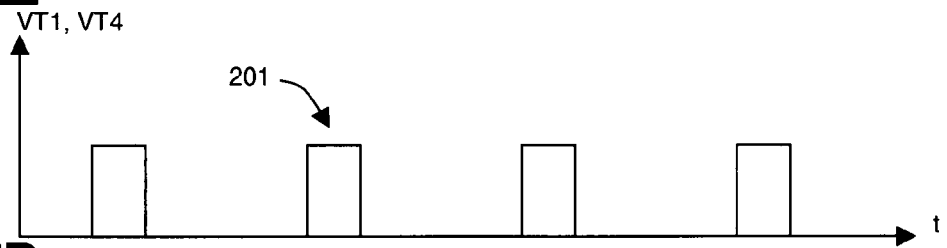
FIGS. 7A to 7E represent graphs illustrating operation of the conversion device according to the invention according to a voltage step-up/step-down mode.
Figure 7B:
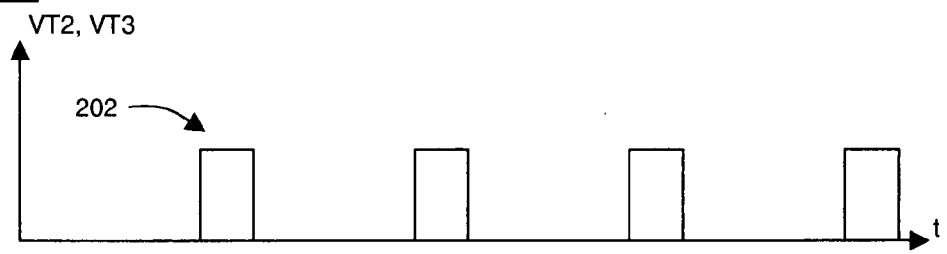
Figure 7C:
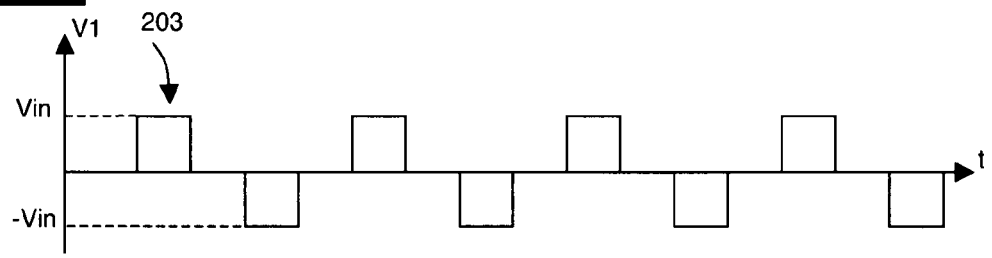
Figure 7D:
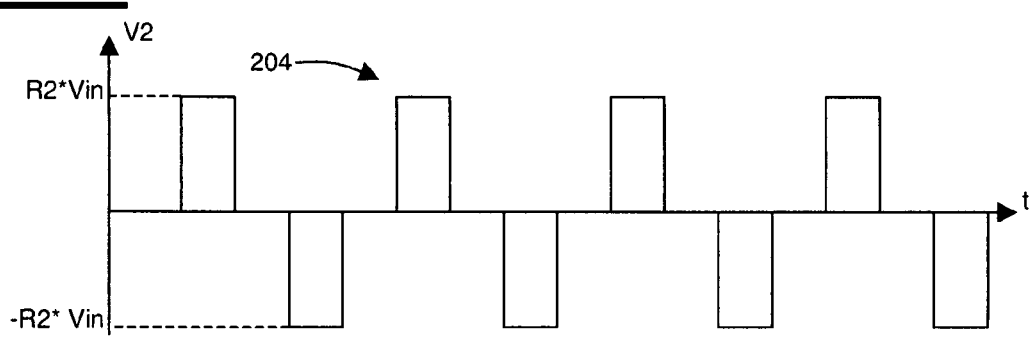
Figure 7E:
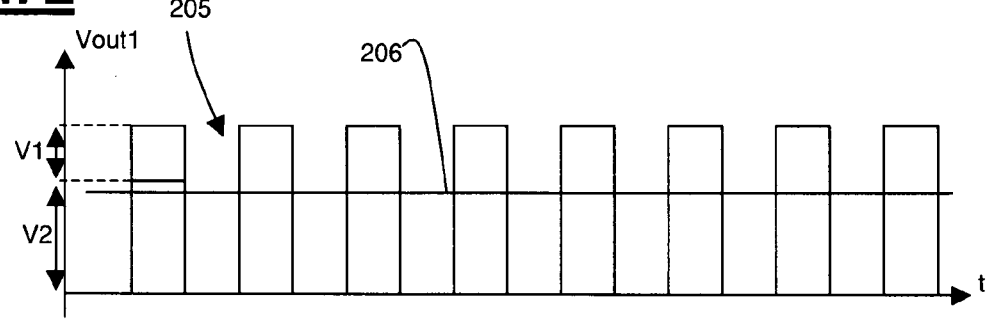
Figure 8A:
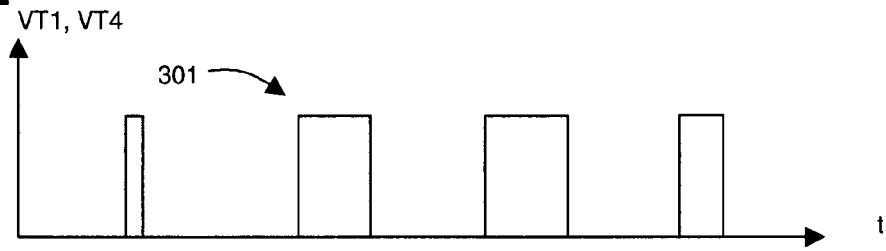
FIGS. 8A to 8E represent graphs illustrating operation of the conversion device according to a voltage conditioning mode.
Figure 8B:
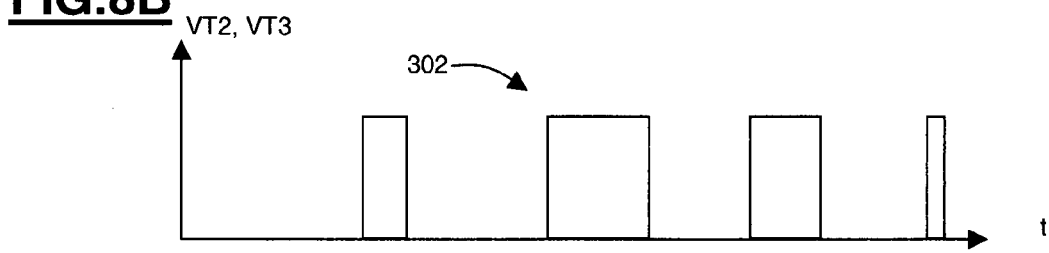
Figure 8C:
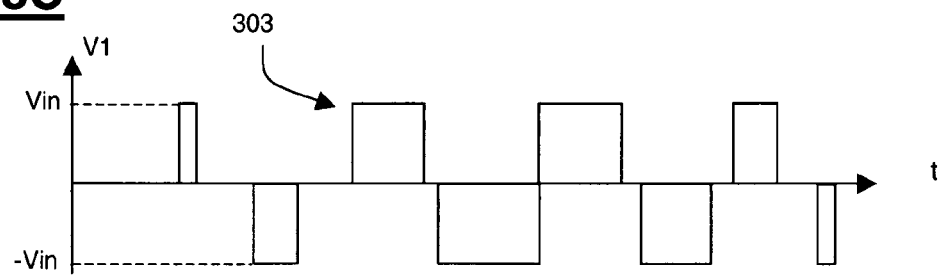
Figure 8D:
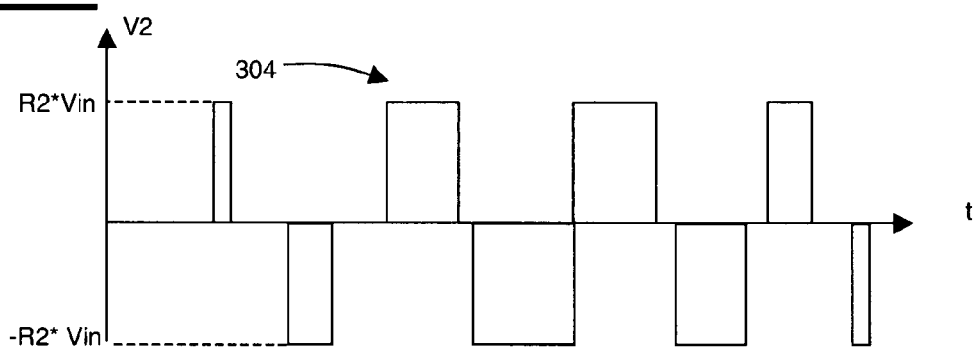
Figure 8E:
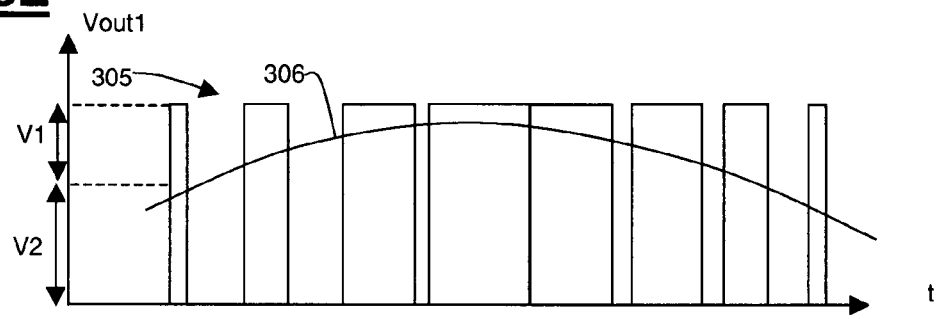

Such an uninterruptible power supply is represented in FIG. 6. The uninterruptible power supply 101 comprises a charger 102 connected on one side to a power distribution system 103 and on the other side to a battery bank 104. When the uninterruptible power supply is operating in a charging mode of the battery, the latter is charged via the charger 102. The uninterruptible power supply 101 also comprises a converter of a DC voltage Vin into an AC voltage, referenced 105. This converter 105 is connected on one side to the battery bank 104 and on the other side to the power distribution system 103. When the uninterruptible power supply is operating in an inverter mode, the DC-to-AC voltage converter 105 is designed to supply an AC voltage to the output 110. In FIG. 6, the power distribution system comprises an incoming line 106, a circuit breaker 107, a filter 108 connected in series on at least one conductor of the incoming line, an output selector switch 109 to switch an output line 110 onto a voltage of the input line or onto the AC voltage supplied by the uninterruptible power supply if the input line is malfunctioning, and an output relay 111.

The DC-to-AC voltage converter 105 represented in FIG. 6 comprises a conversion device of the DC voltage Vin, according to an embodiment of the invention, enabling the input DC voltage Vin to be converted into rectified pulsed voltage Vout1. This conversion device, referenced 51, comprises, as in FIG. 3, first conversion means 2, superposition and rectifying means 52, and a transformer 4 comprising at least one primary winding 5 connected to the first conversion means and at least one secondary winding 6 connected to the superposition and rectifying means. The converter 105 represented in FIG. 6, also comprises filtering means 131, connected on output of the conversion device 51 and designed to filter the rectified pulsed voltage Vout1. These filtering means 131 comprise an inductance 132 connected in series and a capacitor 133 connected in parallel. The converter 105 represented in FIG. 6 further comprises second conversion means 141 connected on one side to the filtering means and on the other side to the line-side power distribution system. These second conversion means in this case enable the rectified and filtered, pulsed voltage to be converted into AC voltage.

The conversion device 51 represented in FIG. 6 can easily be adapted to operate in reversible manner, i.e. to operate either in inverter mode or in charger mode. This adaptation can consist in adding third conversion means to the superposition and rectifying means. These third conversion means can be transistors reverse-connected in parallel on each of the diodes of the superposition and rectifying means 52.

In an inverter mode, the transistors T1 and T4 of the first conversion means operate alternately with the transistors T2 and T3, the diodes d1 to d4 reverse-connected in parallel on said transistors being inactive. In this inverter mode, the diodes D1 to D4 of the superposition and rectifying means 52 enable the primary pulsed voltage and the secondary pulsed voltage to be superposed and the resulting pulsed voltage to be rectified.

In a charger mode, the transistors T1 to T4 are off and the diodes d1 to d4 enable a pulsed voltage to be rectified by means of transistors, not shown, reverse-connected in parallel on the diodes D1 to D4.

The conversion device according to the invention can be adapted to operate in voltage step-up/step-down mode. According to this voltage step-up/step-down mode, the conversion device enables a DC voltage Vin to be converted into a pulsed and rectified output voltage Vout1 so as to obtain, after filtering, a DC voltage of higher value than the input DC voltage Vin. In this embodiment, the first conversion means can be low-frequency conversion means. What is meant by low frequency is a frequency having the same order of magnitude as the power distribution system frequency.

Operation in voltage step-up/step-down mode is illustrated by FIGS. 7A to 7E. The transistors T1 to T4 of the first conversion means are commanded so as to produce a primary pulsed voltage V1 on output of the first conversion means. The transistors T1 and T4 operate alternately with the transistors T2 and T3 due to the command signals 201 and 202 represented by FIGS. 7A and 7B. The transistor bridge of the first conversion means supplies a primary pulsed voltage V1, represented by the graph 203 of FIG. 7C, comprising a succession of positive and negative pulses and having a substantially equal amplitude to the input DC voltage Vin. From the primary pulsed voltage V1, the transformation means supply a secondary pulsed voltage V2, represented by the graph 204 of FIG. 7D, comprising a succession of positive and negative pulses and having a substantially equal amplitude to the product of the input DC voltage Vin by the transformation ratio R2 of the transformation means. From this secondary pulsed voltage V2, the superposition and rectifying means supply a pulsed and rectified output voltage Vout1, represented by the graph 205 of FIG. 7E. The output voltage Vout1 comprises a succession of positive and negative pulses having a substantially equal amplitude to the sum of the amplitude of the primary pulsed voltage V1 and of the amplitude of the secondary pulsed voltage V2, i.e. substantially equal to the product of the input DC voltage Vin by the sum of the transformation ratio R2 and unity. In the case represented in FIG. 7E, suitable filtering enables a substantially DC voltage 206 of higher value than the input DC voltage to be obtained. In this way, the conversion device operates in a voltage step-up mode while limiting the power dissipated in the transformer and in most of the components of said device. In other cases, not represented, by reducing the pulse width duty cycle or modulation rate of the transistors T1 to T4, the conversion device can operate in a voltage step-down mode, i.e. to supply a lower mean voltage than the input voltage Vin.

The conversion device of the invention can also be adapted to operate in voltage conditioner mode. According to this voltage conditioner mode, the conversion device enables a DC voltage Vin to be converted into a pulsed and rectified output voltage so as to obtain rectified half-waves of a sine-wave voltage after filtering. This operating mode can also be qualified as pulse width modulation. In this embodiment, the first conversion means are preferably high-frequency conversion means, i.e. having an operating frequency of about one kilohertz.

Operation in voltage conditioner mode is illustrated by FIGS. 8A to 8E. In the same way as in voltage step-up/step-down mode, the transistors T1 to T4 of the first conversion means are commanded so as to produce a primary pulsed voltage V1 on output from the first conversion means. The transistors T1 and T4 operate alternately with the transistors T2 and T3, due to the command signals 301 and 302 represented by FIGS. 8A and 8B. Unlike voltage step-up/step-down mode, the duration of the pulses of the command signals 301 and 302 varies so as to enable the rectified half-waves of a sine-wave voltage to be reconstituted after suitable filtering. In the same way as in voltage step-up/step-down mode, the transistors of the first conversion means supply a primary pulsed voltage V1, represented by the graph 303 of FIG. 8C, comprising a succession of positive and negative pulses and having a substantially equal amplitude to the input DC voltage Vin. In the same way as in voltage step-up/step-down mode, from the primary pulsed voltage V1, the transformation means supply a secondary pulsed voltage V2, represented by the graph 404 of FIG. 8D, comprising a succession of positive and negative pulses and having a substantially equal amplitude to the product of the input DC voltage Vin by the transformation ratio R2 of the transformation means. From this secondary pulsed voltage V2, the superposition and rectifying means supply a rectified pulsed voltage Vout1, represented by the graph 305 of FIG. 8E. The pulsed and rectified output voltage Vout1 comprises a succession of positive pulses having a substantially equal amplitude to the sum of the amplitude of the primary pulsed voltage V1 and of the amplitude of the secondary pulsed voltage V2, i.e. substantially equal to the product of the input DC voltage Vin by the sum of the transformation R2 ratio and unity. The variations of duration of the pulses enable a rectified sine-wave voltage 306 to be obtained after suitable filtering. In this way, the conversion device operates in a voltage conditioner mode, while limiting the power dissipated in the transformer and in most of the components of said device.

The DC voltage conversion device of the invention is usually of the forward type. In addition, the DC voltage conversion device allows an almost continuous and alternate energy transfer.

One advantage of the invention is to propose a DC voltage conversion device comprising components and transformation means presenting reduced power stresses with respect to the power transmitted by said device.

Another advantage of the invention is to propose a DC voltage conversion device comprising components and transformation means having a reduced size.

Yet another advantage of the invention is to limit the heat losses by the components and the transformer of the conversion device.

The invention claimed is:

1. DC voltage conversion device comprising:
   first conversion means to receive the DC voltage and to supply a primary pulsed voltage, and
   transformation means connected to the first means to supply a secondary pulsed voltage,
   wherein the device comprises primary and secondary voltage superposition and rectifying means to supply a pulsed and rectified output voltage, said superposition and rectifying means being connected to the first conversion means and to the output of the transformation means, said output voltage comprising pulses having substantially equal amplitudes to the sum of the amplitudes of the pulses of the primary pulsed voltage and of the secondary pulsed voltage.

2. Device according to claim 1, wherein at least one conductor on output from the first conversion means is connected to the superposition and rectifying means.

3. Device according to claim 1, wherein the first conversion means are low-frequency or high-frequency conversion means.

4. Device according to claim 1, wherein the transformation means comprise at least one primary winding connected to the output of the first conversion means and at least one secondary winding connected to the input of the superposition and rectifying means, the coiling direction of the primary winding of the transformer being the same as that of the secondary winding.

5. Device according to claim 1, wherein the first conversion means comprise two transistor branches on which at least two transistors are connected in series, the mid-point of each branch being connected to the input of the transformation means and to first inputs of the superposition and rectifying means.

6. Device according to claim 1, wherein the superposition and rectifying means comprise two diode branches, each branch comprising at least two diodes connected in series in the same direction, the mid-point of each branch being connected to the output of the transformation means.

7. Device according to claim 6, wherein the incoming ends of each branch are connected to the output of the first conversion means.

8. Converter for converting a DC voltage into AC voltage comprising:
   a DC voltage conversion device,
   filtering means connected to said conversion device, and
   second conversion means connected to the filtering means,
   wherein the conversion device is a device according to claim 1 supplying a pulsed voltage of higher amplitude than the DC voltage, the filtering means being connected on output of the superposition and rectifying means of said conversion device.

9. Uninterruptible electric power supply comprising:
   storing means for storing electric power, and
   a converter for converting a DC voltage into AC voltage connected to the storing means, said converter comprising a DC voltage conversion device,
wherein the DC voltage conversion device is a device according to claim 1, said device being used to convert the DC voltage supplied by said storing means into pulsed voltage of higher amplitude than the DC voltage.

* * * * *